Dec. 5, 1939.  J. BRUECKER  2,182,067
PROCESS OF MANUFACTURING A SHAVING TOOL
Original Filed May 20, 1937    3 Sheets-Sheet 1
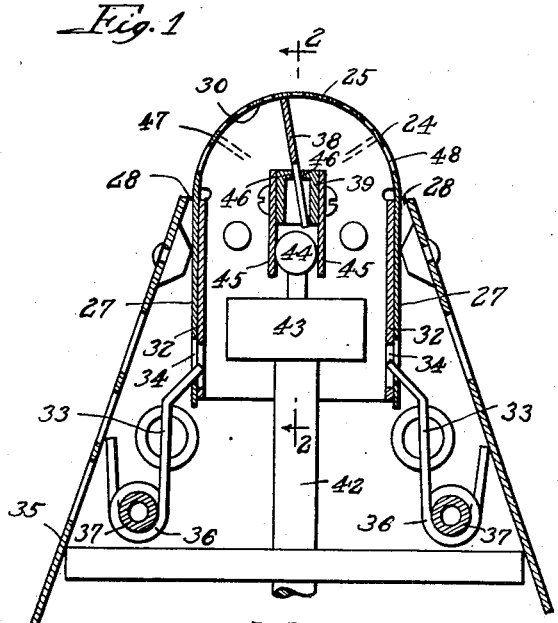
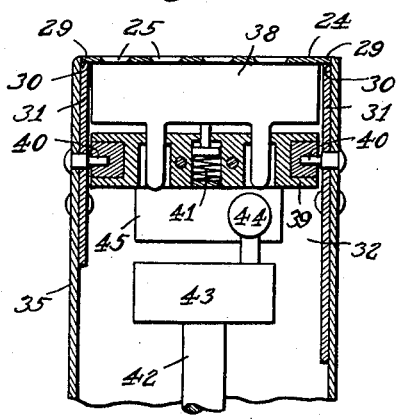
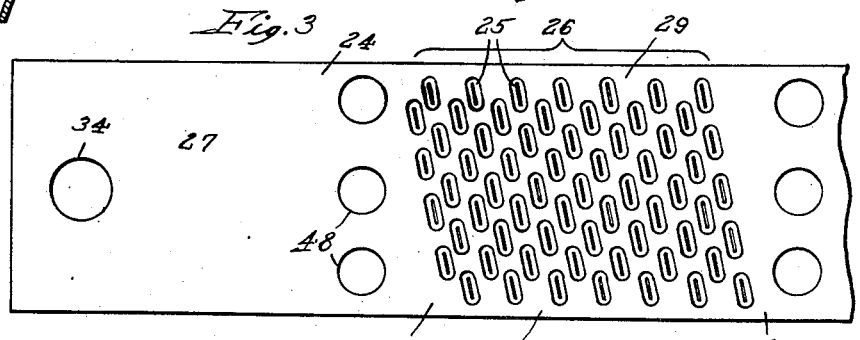
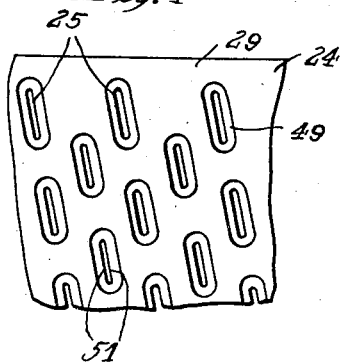
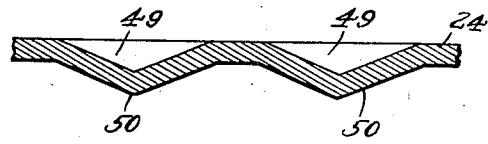
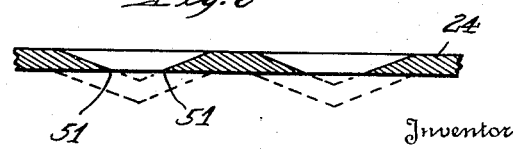
Inventor
JOHN BRUECKER
By McCanna, Montecara + Marsback
Attorney

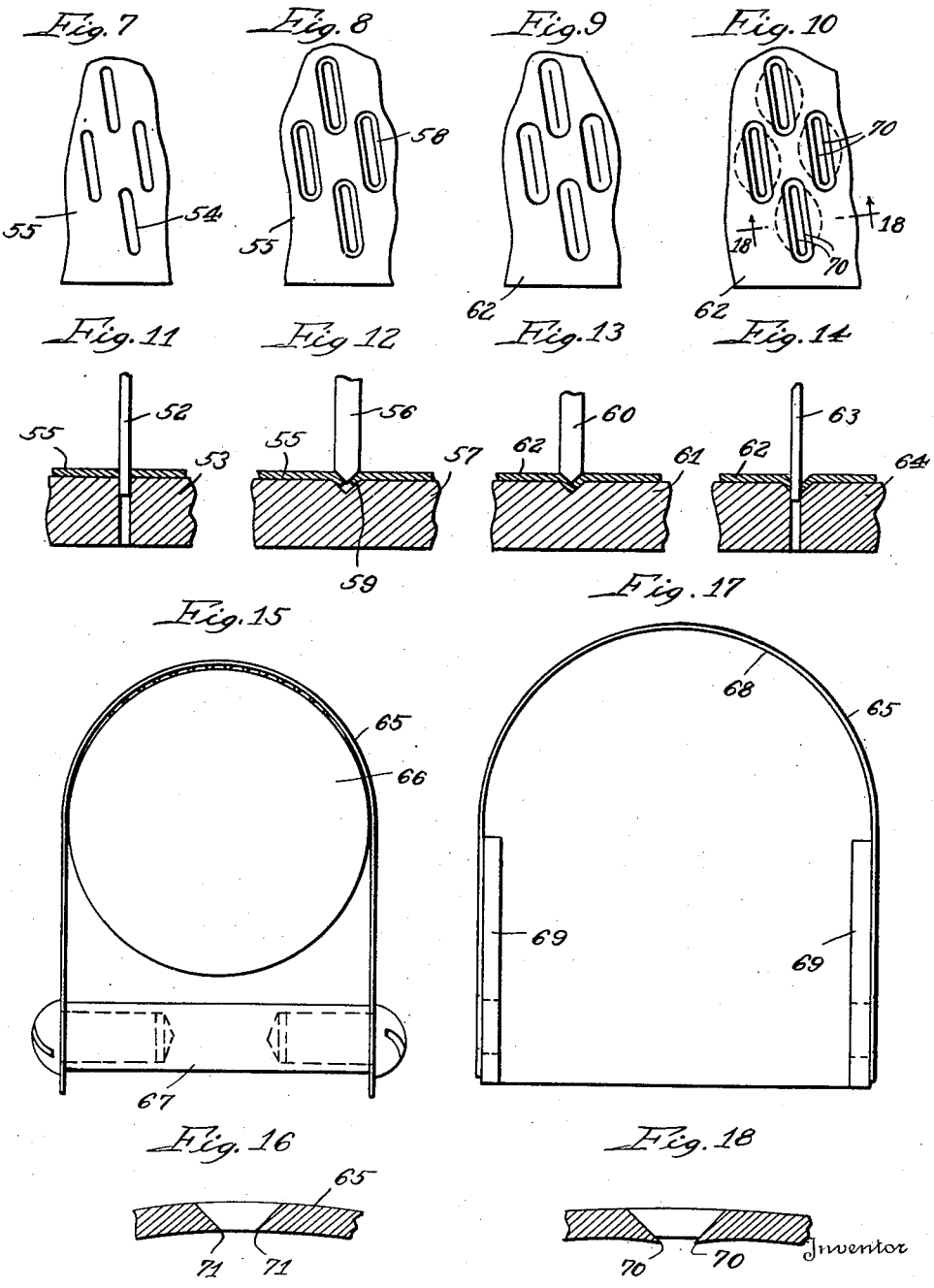

Dec. 5, 1939.   J. BRUECKER   2,182,067
PROCESS OF MANUFACTURING A SHAVING TOOL
Original Filed May 20, 1937   3 Sheets-Sheet 3
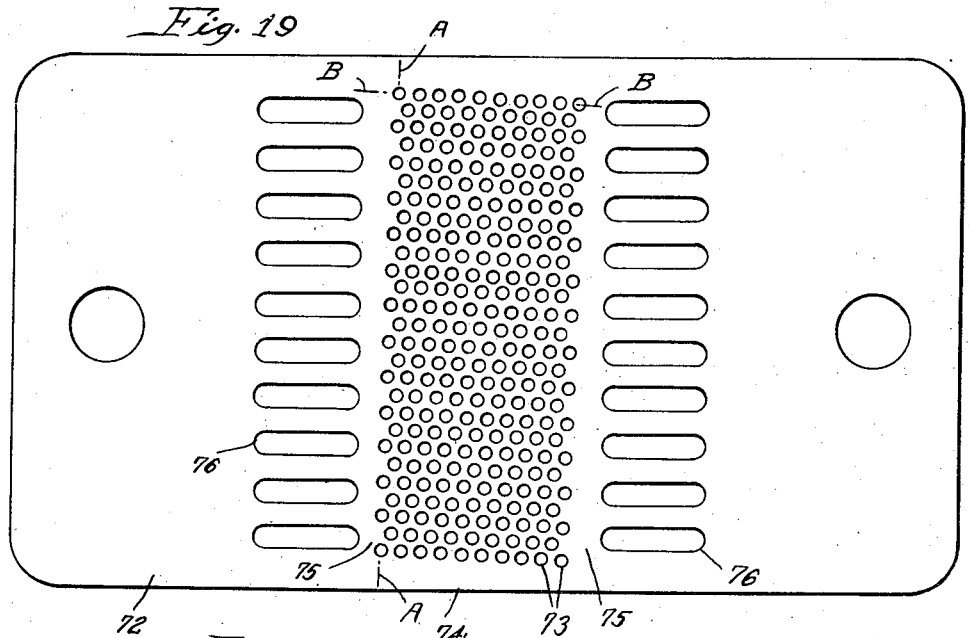
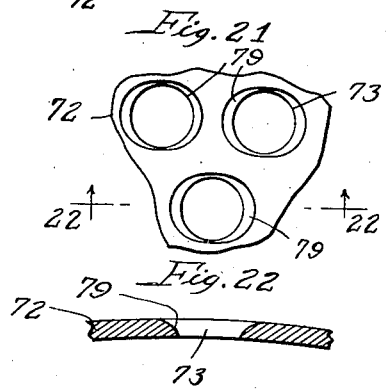
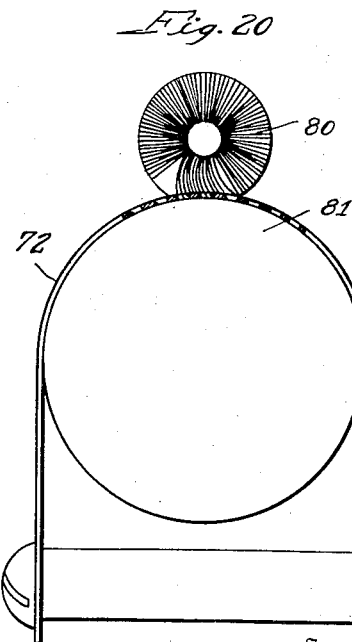
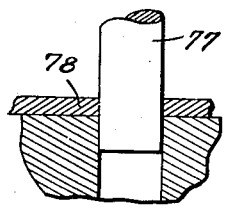
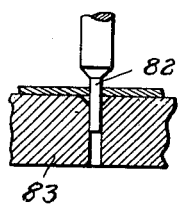
Inventor
JOHN BRUECKER
By McCanna, Mintacom & Morhack
Attorney Patented Dec. 5, 1939

2,182,067

UNITED STATES PATENT OFFICE 2,182,067

PROCESS OF MANUFACTURING A SHAVING TOOL

John Bruecker, Chicago, Ill.

Original application May 20, 1937, Serial No. 143,754. Divided and this application February 8, 1938, Serial No. 189,573

11 Claims. (Cl. 76—104)

This application is a division of my application Serial No. 143,754, filed May 20, 1937, and is a continuation in part of my application Serial No. 98,541, filed August 29, 1936, on which Patent No. 2,081,694, was granted May 25, 1937, for what is commonly known as a dry shaver.

The present invention relates to a process of manufacturing a shaving tool such as a dry shaver and has particular reference to the manufacture of the perforated shearing blade for what in commercial practice is termed the "comb".

An object of my invention is to provide improved methods of manufacturing shearing blades suitable for use in a dry shaver, whereby to effect economies in the cost of manufacture and to provide a more efficient and satisfactory shearing blade for the purpose intended.

Other objects and attendant advantages will be appreciated by those skilled in this art as the invention becomes better understood by reference to the following description when accompanied by the following drawings, in which—

Figure 1 is a longitudinal section through the cutting head end of a shaver made in accordance with my invention;

Fig. 2 is a section taken substantially on the section line 2—2 of Figure 1;

Fig. 3 is a plan view of one embodiment of the thin shearing blade which forms the cutting head, one end of the blade being broken away;

Fig. 4 is an enlarged plan or face view of the perforated portion of said shearing blade;

Figs. 5 and 6 are detail sectional views showing the manner in which the slots are formed in the central portion of said shearing blade;

Figs. 7, 8, 9 and 10 are enlarged plan views of the face of a shearing blade in connection with different methods of making the same according to my invention;

Figs. 11, 12, 13 and 14 are vertical sections corresponding with Figs. 7, 8, 9 and 10, respectively, illustrating the die action in forming the perforations;

Fig. 15 is a somewhat diagrammatic view showing the step of lapping the shearing face of the blade according to my invention;

Fig. 16 is an enlarged detail section crosswise of one of the perforations after the lapping operation, with the blade flexed to the curvature which it occupies in actual operation;

Fig. 17 is a somewhat diagrammatic view showing a shearing blade of the kind illustrated in Fig. 10 supported in an operative position in the shaver, the radius being larger than that of the lapping tool;

Fig. 18 is an enlarged detail section crosswise through one of the perforations of the shearing blade in its operative position shown in Fig. 17, as for example, taken on the section line 18—18 of Fig. 10;

Fig. 19 is a plan view of the face of a shearing blade of a modified form, embodying my invention;

Fig. 20 is a somewhat diagrammatic view illustrating a step in the operation of forming the blade shown in Fig. 19;

Fig. 21 is an enlarged detail plan view of a perforated portion of the blade shown in Fig. 19;

Fig. 22 is a section taken on the section line 22—22 of Fig. 21, and

Figs. 23 and 24 illustrate additional forms of punching operations in the manufacture of a cutting head according to my invention.

My invention is applicable to a dry shaver adapted to be embodied in a small hand unit for convenient manipulation, which preferably but not necessarily includes an electric motor or the equivalent for operating the cutter. In the present embodiment I have omitted the motor end of the unit and have shown only the cutting head end. The construction shown is merely for purpose of illustrating the principles of my invention.

Referring to Figs. 1 and 2, the cutting head designated generally by the reference numeral 24 and in commercial practice called the comb, is of extremely thin flexible material, such for example, as a strip of spring steel of approximately .003" in thickness. In the preferred form the comb has closely positioned perforations or hair-receiving openings 25 throughout a medial area 26. The comb is normally flat, as shown in Fig. 3. By flexing the comb medially to the semi-cylindrical form shown in Figure 1, the flat end portions 27 may be inserted through narrow slot-like openings 28 in the housing to the operative position here shown. In this position, the marginal portions 29 along the longitudinal edges of the comb seat against semi-circular shoulders 30 formed on a suitable support or bracket having end walls 31 and side walls 32. Suitable means, such as spring holding elements 33, enter openings 34 in the comb and exert a downward pull to hold the marginal portions 29 firmly seated against the stationary shoulders 30 and with the perforated portion in the flexed or semi-cylindrical shape shown. The bracket is fixed within a suitable housing designated generally by 35. Each spring element 33 is part of a coil spring 36 carried on a post 37 extending between opposite walls of the housing 35, the spring elements being constantly urged inwardly and downwardly to pull the comb down to its working position. Suitable means such as a key not shown here but disclosed in my prior application may be provided for spreading the spring elements 33 and withdrawing them from the comb so that the latter is free to be removed through the openings 28. It will be apparent that the user may grasp the projecting comb between the fingers and remove it bodily. This is desired for the purpose of replacing the comb or for changing blades and also for giving access to the cutter for inspection and replacement. The comb may be replaced by repeating the operation, the key being removed or withdrawn after the comb is in the working position, thereby permitting the spring elements to engage the end portions of the comb to hold the comb firmly against the seats 30. In the commercial practice of my invention the comb is held in arcuate form by means other than disclosed in the present application, the commercial means being the subject matter of a separate application.

The cutter 38, preferably of steel or a suitable alloy, is in the form of a thin flat blade and extends lengthwise from end to end of the cutting head as shown in Fig. 2. The cutter is carried by a rock-bar 39 mounted to oscillate on suitable bearings 40, in this instance carried by the end walls of the bracket. In the preferred form, the center about which the rock-bar oscillates is concentric with the semi-cylindrical perforated portion of the cutting head. The rock-bar is suitably slotted or shaped to receive the cutter so that the latter is free to move bodily outwardly under centrifugal force when the rock-bar is oscillated at a high speed, or to move outwardly under the influence of spring pressure such as imposed by a suitable spring 41, or by the influence of both centrifugal force and spring pressure, as here employed. This is to maintain the cutting edge of the cutter in intimate shearing engagement with the inner face of the comb from end to end of the cutter. The cutter is oscillated at a comparatively high speed by suitable power means. This may be done in many ways from a power driven shaft, but I prefer to employ a small electric motor contained within the handle portion of the shaver as above mentioned and suitably arranged to impart rotary motion at a high speed to the shaft 42. This shaft is equipped with a disk 43 which carries an eccentric pin equipped with a ball 44 disposed between parallel plates 45 fixed to the rock-bar. By this means the cutter will be oscillated at a high speed, in this instance, through an arc indicated by the dotted line positions of the cutter, Fig. 1. The pressure of the cutter against the inner face of the comb will be uniformly distributed from end to end of the cutter, and the cutting edge will be constantly urged against the extremely thin comb so as to provide intimate shearing engagement between the edge of the cutter and the numerous cutting edges formed by the perforations in the comb. In the form here shown the cutter is mounted so that it is free to have a tilting movement upon and with respect to the rock-bar at the end of each stroke, as upon the fulcrum faces 46, for reasons explained in my prior application; but it will be manifest that this pronounced tilting action is not essential. In the commercial practice of my invention the cutter is mounted in a radial position with respect to the rock-bar and has sufficient play therein to permit of the desired bodily movement under centrifugal action or spring pressure, or both, as hereinabove described.

The hair-receiving openings 25 are confined to the zone 26 above mentioned which is shorter in length than the travel of the cutter at its outer end. Thus the cutter at each end of its stroke comes to rest at an imperforate area 47 and thereby avoids any danger of uncut hairs being caught between the cutter and the comb at this stage of the operation. I prefer to employ a series of openings 48 in the comb just beyond each imperforate area 47 for the discharge of cut hair.

In the embodiment of my invention shown in Figs. 3 to 6 inclusive, the medial portion of the comb or shearing blade is provided with a plurality of series of hair-receiving openings in the form of slots. These series of slots extend from one edge of the medial portion to the other and are arranged at an angle of approximately 10° with respect to the end edges. As shown in Figs. 3 and 4, the slots of one series are staggered with respect to the slots of the contiguous series. The slots are formed by placing the comb forming strip between a pair of dies, one of which embodies a plurality of ribs corresponding in number and design to the slots, and the other of which embodies a plurality of recesses for receiving the ribs of what may be termed the male die. When the dies are brought together with the comb forming strip therebetween, the ribs of the male die deflect the metal of the strip so that the latter has indentations 49 on one side thereof and projections 50 on the other side. The ribs on the male die are greater in height than the strip is thick with the result that the indentations in the one side of the strip, that is, the skin-engaging face, are of greater depth than the strip. After the strip has been subjected to the action of the dies, the projections 50 on the inner face of the strip are ground off or reduced, with the result that the slots 25, referred to above as hair-receiving openings, are formed. Because of the specific manner in which the slots are formed, the comb has on the outer face thereof a plurality of series of cavities or indentations 49, and embodies on its inner face cutting edges 51. The latter define the slots and are flush with the inner face of the comb. When the comb is moved over the skin for shaving or hair depilation purposes, the skin works its way into the cavities and the hairs when they encounter the slots, snap or work their way through the slots. Because of the cavities and the manner in which they operate to receive the skin, the cutting edges 51 are aligned with the hairs at the points at which they protrude from the skin. As a result of this, the blade type cutter 38 when it is oscillated within the comb as above described, effects an extremely close cutting of the hairs. The cavities 49 are dished and serve to direct the hair through the slots. The slots are the same in length, as shown in Fig. 3, and each slot is placed from the adjoining slots of its series a distance slightly less than the slots length. As a result of this, and because the slots of every other series are staggered with respect to the slots of alternate series, all of the hairs encountered by the comb during each sweep of the head in connection with a shaving or hair depilation operation are encountered by the slots and are subjected to the shearing action of the cutter against the cutting edges at the inner face of the comb.

In Figs. 7 to 14, inclusive, I have shown other methods of forming the slots according to my invention. In Figs. 7 and 11, male and female dies 52 and 53 are shaped for punching slots 54 in the thin strip 55 which forms the comb or shearing blade. In Figs. 8 and 12 a second set of male and female dies 56 and 57, respectively, form the indentations 58 and projections 59 on the transversely perforated strip 55. In Figs. 9 and 13 a set of male and female dies 60 and 61, respectively, form the indentations and projections and also slit or perforate the metal strip 62 in a single punching or stamping operation. In Figs. 10 and 14 a second set of male and female dies 63 and 64, respectively, further perforate the indented and slitted parts of the strip 62 to give greater width to the slots. All of the foregoing operations are formed with the strip flat.

My invention contemplates finishing the inner face of the comb in such manner as to insure the provision of cutting edges either flush with such inner face or spaced slightly inwardly from such face, thereby insuring most efficient shearing action by conjoint use of the cutter. This is accomplished preferably by flexing the perforated portion of the comb or strip to a curvature approximately the same as it occupies when in operative position and lapping the inner face by means of a lapping tool of approximately the same diameter. This step in the operation of manufacture is illustrated in Fig. 15 in which one of the comb strips here designated 65 is held on an annular lapping bar or arbor 66 in substantially the same shape and condition as when it is in operating position in a shaver. Suitable means may be employed for this purpose, and I have here shown a spacer 67 connecting the flat sides of the strip, holding them in approximately parallel relation. By suitable motion of the lapping bar the projections left on the face of the strip as a consequence of the punching or forming operation will be removed or reduced by abrasion, leaving a smooth, mirror-like inner face. Preferably a force is applied downwardly on the spacer 67 either by spring means or a weight or suitable pressure-applying means, so that the perforated portion of the strip will be held down against the rotating arbor with substantially the same pressure as applied by the spring elements 33 when holding the strip in operative position in a shaver. Thus I am able to obtain a very fine degree of precision in the sharpness of the shearing edges at the face of the strip and to locate these edges precisely in the arcuate plane along which the shearing edge of the cutter travels. In other words, the cutting edges at the inner end of the perforations will lie in a true arc coincident to the arc of travel of the oscillating cutter, thus giving a very efficient cutting action. By making the perforations in the form of slots and arranging these at an angle to the plane of travel of the cutter, a fine shearing action is obtained. By making the lapping arbor slightly smaller in diameter so that the curvature of the perforated portion of the strip is slightly less than that which it occupies in operative position, the opposed cutting edges at the face of the strip will be projected slightly inwardly from the inner face of the strip when the latter is expanded or opened to its operative position, thus further insuring sharp cutting action. Another phase of my invention in this respect is to expand or open the strip 65 to a wider diameter as shown in Fig. 17, in which case the semi-circular shoulders 68 and the side walls 69 of the bracket or the equivalent on which the strip is supported in the shaver, are shaped to provide for this larger diameter. Under this condition the opposed shearing edges 70 will be projected slightly inwardly in the manner illustrated in Fig. 18. This is due to stressing the metal by reason of deflection from the shape in which these edges were finished, the deflected areas being diagrammatically illustrated by the dotted lines in Fig. 10. Contrasted to this, Fig. 16 shows the opposed cutting edges 71 of the finished strip 65 in the normal condition in which they are finished, that is, flush with the inner face. When the strip is removed from the lapping fixture or from its operative position in the shaver, it will assume a flat condition, as illustrated in Fig. 3. This makes for convenience in handling and packing as well as in replacement of combs. The lapping arbor may be of copper or it may be of any suitable abrasive material, the step of removing or reducing the projecting material being accomplished without disturbing the temper of the spring steel strip. Instead of entirely removing the projecting material, this operation may be carried on only sufficiently to reduce the projection, thus leaving a series of smooth finished surfaces in an arcuate plane slightly spaced from the face proper of the strip. This form of my invention may be used particularly where the perforations are quite close together, and in such staggered relation as to insure continuous bearing contact for the cutter, thus reducing friction between the oscillating cutter and the comb.

In practice I have made the width of the slots from .009" to .012", and a length of approximately $\frac{1}{16}$ of an inch, using a strip of spring steel of .003". These dimensions are merely for purpose of illustration.

My invention also contemplates a comb having the characteristics disclosed in Figs. 19 to 22, inclusive. Here the strip of extremely thin metal designated by 72 is of somewhat different proportions from that shown in Fig. 3, it being employed in a commercial form of my invention. Instead of using elongated slots, I prefer annular perforations 73 closely positioned and arranged in rows longitudinally and transversely. The longitudinal rows indicated by AA are inclined with respect to the end edges 74, and the transverse rows indicated by BB are inclined also with respect to said edges. By reason of this staggered relation of the holes, the cutting edge of the cutter moving across the inner face of the strip is effective successively on the short lengths of hair projecting through these openings, as a result of which the cutting resistances as well as the wear on the cutting edge is more evenly distributed. In this form there is also provided an imperforate area 75 for the purpose above described and elongated hair-discharge openings 76 flanking each imperforate area. These annular perforations are preferably punched out in a single operation by male and female die members 77 and 78, Fig. 23, and the inner face of the strip is lapped in the same manner as described above with reference to Fig. 15, thus removing any burrs or projecting metal and providing accurate shearing edges and a smooth surface on the inner face of the strip. Instead of depressing or displacing any of the metal of the strip in this punching operation, I here form merely annular through openings and in this way I am able to locate the openings closer together without weakening the metal structure. The openings at the outer face are then beveled or rounded at the corners as at 79 by separate means such, for example, as by an abrasive buffing tool 80 while the strip is held on a suitable stationary fixture 81, as shown in Fig. 20. The tool 80 is shown being rotated in a clockwise direction and moved transversely to the right across the shearing zone, thus reducing the corner edges to a greater degree at the side toward the left. Reversal of this operation similarly reduces the corner edges at the side toward the left. This gives a somewhat elongated cavity or mouth at the entrance side of each opening as shown in Figs. 21 and 22, which facilitates entrance of the hair. I may, however, employ die elements such as 82 and 83 as shown Fig. 24 for perforating the strip and indenting the outer corners by deflection of the metal in a single stroke of the moving die element. This form of die may also be used in making perforations in the form of slots.

My invention contemplates new and improved results in shavers of this type, particularly by reason of the provision of annular perforations arranged close together in a shearing area and providing maximum open area with maximum strength and maximum length of shearing edges. In actual practice with a comb of .003" thickness, I employ perforations of approximately .025" diameter and space the holes approximately .040" from center to center with respect to each other. This gives an open area of approximately 35% of the shearing area of the comb and gives annular cutting edges of considerable length. This construction also allows a comparatively large body of metal to insure strength throughout this area. In using a comb of .004" thickness, the perforations would be of slightly larger diameter, and when the comb is of .002" thickness, the openings should be of slightly less diameter. With my invention the hairs enter the perforations in all directions of movement of the comb, but their entrance is facilitated by the cavities 79 when the comb is worked back and forth in a transverse plane. By reason of the relatively large open area and the closeness with which the cutting edges are brought to the skin without irritation, I am able to provide closer and more efficient shaving than is possible with prior shavers of this general class.

The invention is not to be understood as restricted to the details set forth, nor to the embodiments shown, since these may be modified within the scope of the appended claims, without departing from the spirit and scope of the invention, in which—

I claim:

1. The method of making a comb for a shaver of the character described comprising punching perforations in a strip of extremely thin spring metal, and lapping the cutting side of the perforated portion while said portion is flexed in an arc approximating that which it occupies in cooperation with a cutter.

2. The method of making a comb for a shaver of the character described comprising perforating a strip of extremely thin spring metal by a punching operation from the face side to provide hair-receiving openings, flexing the strip to an arcuate form throughout said perforate area with the cutting side innermost and approximating the arc which it occupies in cooperation with a cutter, and lapping the inner side of the strip while it is confined in said arcuate form.

3. The method of making a comb as set forth in claim 2, in which the lapping tool is cylindrical and of a diameter approximately the same as the curvature of said cutting side when in operative position in a shaver, and the comb is drawn around the periphery of said lapping tool and the latter is rotated to provide lapped cutting edges in the arcuate plane of the inner side of the comb.

4. The method of making a comb of the character described consisting in forming comparatively small localized depressions in one side of a strip of extremely thin spring metal, removing the projecting metal at the opposite side of the strip sufficiently to provide an opening at the base of each depression to serve as a hair-receiving opening, and lapping the inner edges of said hair-receiving openings while the strip is held in an arcuate form corresponding approximately with that which the strip occupies in working position on a shaver.

5. The method of making a comb for a shaver, including the step of providing hair-receiving apertures in a thin strip of metal, the step of flexing said apertured portion of the strip to approximately that curvature which it will have when placed in operative position in a shaver, and lapping the edges of the apertures on the concave side while the strip is held in said flexed condition.

6. The method of making a comb for a shaver, including the step of punching through openings in the medial portion of a thin strip of metal, the step of flexing said medial portion so that the side opposite from that first mentioned is of a curvature approximately that which said medial portion will have when placed in operative position in a shaver, and lapping the concave face of said medial portion while it occupies said curvature, whereby to produce a smooth arcuate surface and cutting edges at the inner end of the openings accurately located in said arcuate plane.

7. The method of making a comb for a shaver, including the step of punching hair-receiving openings in a strip of thin spring steel, the step of flexing the strip to approximately that curvature which the strip will have when placed in operative position in a shaver, and the step of lapping the concave face of the flexed strip by means of a tool of approximately the curvature first mentioned.

8. The method as set forth in claim 7, including the step of applying an abrasion tool to the outer face of the perforated portion of the strip to reduce the corner edges at the entrance end of said openings.

9. The method as set forth in claim 7, including the step of applying a buffing tool to the outer face of the perforated portion of the strip to reduce the corner edges at the entrance end of said openings, and of working said buffing tool in a plane transversely of the comb to reduce said corners to a greater degree at the transverse sides of the openings.

10. The method of making a comb for a shaver, including the step of punching hair-receiving openings in a strip of extremely thin sheet metal, the step of depressing the metal contiguous to the edges of said openings to form cavities at the entrance side of the openings, the step of flexing the strip to approximately that curvature which the strip will have when placed in operative position in a shaver, and the step of reducing said projecting portions at the opposite side by an abrasion tool and thereby forming sharp cutting edges at the inner end of the openings.

11. The method of making a comb for a hair cutting device comprising the steps of perforating a strip of thin sheet metal by punching from the face side to provide hair receiving openings, bending the strip to an arcuate form throughout said perforated area with the cutting side innermost and approximating the arc which it occupies in cooperation with a cutter, and lapping the inner side of the perforated area of the strip while it is in said arcuate form, the lapping tool being cylindrical and of a diameter approximately the same as the curvature of said cutting side of the comb when it is in operative position in the hair cutting device.

JOHN BRUECKER.